United States Patent
Yoshida

(10) Patent No.: US 7,797,631 B2
(45) Date of Patent: Sep. 14, 2010

(54) DOCUMENT PRINTING CONTROL APPARATUS AND METHOD

(75) Inventor: Masayuki Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1228 days.

(21) Appl. No.: 10/660,639

(22) Filed: Sep. 12, 2003

(65) Prior Publication Data

US 2004/0051893 A1    Mar. 18, 2004

(30) Foreign Application Priority Data

Sep. 18, 2002 (JP) ............... 2002-272006
Sep. 25, 2002 (JP) ............... 2002-279951

(51) Int. Cl.
*G06K 15/02* (2006.01)
*G06F 17/21* (2006.01)
*G06K 15/00* (2006.01)

(52) U.S. Cl. ............ 715/269; 715/273; 715/243; 715/247; 715/252; 358/1.11; 358/1.9; 358/2.1; 358/1.2; 358/1.18; 345/467; 345/947; 345/948

(58) Field of Classification Search ....... 358/1.11–1.18, 358/1.9, 2.1, 1.2, 450–453, 1.1, 528–538; 715/800, 517, 531, 513, 500, 520, 530, 525, 715/542, 518, 521, 540, 539, 788–801, 790, 715/243–277; 400/61–75; 345/467–472.3, 345/947, 948

See application file for complete search history.

(56) References Cited

U.S. PATENT DOCUMENTS

| | | | | |
|---|---|---|---|---|
| 5,113,492 A | * | 5/1992 | Ariki et al. | 715/520 |
| 5,122,953 A | * | 6/1992 | Uekusa et al. | 715/538 |
| 5,562,350 A | * | 10/1996 | Sakurai | 400/61 |
| 5,754,873 A | * | 5/1998 | Nolan | 715/527 |
| 5,825,987 A | * | 10/1998 | Asada | 358/1.11 |
| 5,959,634 A | * | 9/1999 | Yoshida | 345/467 |
| 6,026,417 A | * | 2/2000 | Ross et al. | 715/517 |
| RE36,704 E | * | 5/2000 | Parker et al. | 715/542 |
| 6,081,831 A | * | 6/2000 | Miura | 709/206 |
| 6,223,191 B1 | * | 4/2001 | Truelson | 715/517 |
| 6,256,650 B1 | * | 7/2001 | Cedar et al. | 715/517 |
| 6,411,315 B1 | * | 6/2002 | Young | 715/788 |
| 6,441,824 B2 | * | 8/2002 | Hertzfeld | 345/472 |
| 6,466,954 B1 | * | 10/2002 | Kurosawa et al. | 715/520 |
| 6,704,467 B2 | * | 3/2004 | Uchida | 382/311 |

(Continued)

FOREIGN PATENT DOCUMENTS

JP    05-323937    12/1993

(Continued)

*Primary Examiner*—Twyler L Haskins
*Assistant Examiner*—Chad Dickerson
(74) *Attorney, Agent, or Firm*—Fitzpatrick, Cella, Harper & Scinto

(57) ABSTRACT

A document printing control apparatus determines, when an output paper size is set by a keyboard operation, block sizes of individual blocks from the output paper size. The apparatus determines the size of an output area and font size from the block sizes determined, and places the output area and characters with the sizes determined. After placing the characters in the output area, followed by editing a layout, the apparatus places the output area and characters according to the edited layout. The apparatus can carry out the scaling of the sizes of the output area and font according to the sizes of the output area and font determined.

3 Claims, 21 Drawing Sheets

| | | MORE THAN 60P | 6P~5P | 5P~4P | LESS THAN 4P |
|---|---|---|---|---|---|
| A | MINCHO TYPEFACE W3 | A | A | A | D |
| B | MINCHO TYPEFACE W5 | B | B | A | D |
| C | MINCHO TYPEFACE W7 | C | C | A | D |
| D | GOTHIC TYPEFACE W3 | D | D | D | D |
| E | GOTHIC TYPEFACE W5 | E | E | D | D |
| F | GOTHIC TYPEFACE W7 | F | F | D | D |
| G | GYOSHO | G | G | H | D |
| H | KAISHO | H | H | H | D |

U.S. PATENT DOCUMENTS

| | | | |
|---|---|---|---|
| 6,816,268 B1 * | 11/2004 | Suzuki | 358/1.11 |
| 6,930,789 B1 * | 8/2005 | Kizaki | 358/1.15 |
| 6,944,823 B2 * | 9/2005 | Kurumida | 715/247 |
| 2002/0036788 A1 * | 3/2002 | Hino | 358/1.11 |
| 2002/0048032 A1 * | 4/2002 | Ichikawa et al. | 358/1.11 |
| 2003/0202211 A1 * | 10/2003 | Yudasaka et al. | 358/1.18 |

FOREIGN PATENT DOCUMENTS

| | | |
|---|---|---|
| JP | 7-219940 | 8/1995 |
| JP | 08-147484 | 6/1996 |
| JP | 2001-344232 | 12/2001 |
| JP | 2001344232 A * | 12/2001 |
| JP | 2001344233 A * | 12/2001 |
| JP | 2002-91946 A | 3/2002 |

* cited by examiner

```
<xhtml>
<table border=" 0" cellpadding=" 0" cellspacing=" 8" >
  <tr>
    <td align=" center" colspan=" 2" width=" 50%" ><font size=" 6" ><em>HEADLINE
</em></font></td>
  </tr>
  <tr>
    <td align=" right" width=" 50%" ><img src=" IMAGE 1.jpg" width=" 50%" >
      <br><br>
      DESCRIPTION OF IMAGE 1.abcdef………
    </td>
    <td align=" right" width=" 50%" ></td>
  </tr>
  <tr>
    <td width=" 50%" ></td>
    <td width=" 50%" ><img src=" IMAGE 2.jpg" width=" 50%" >
      <br><br>
      DESCRIPTION OF IMAGE 2.ABCDEF
    </td>
  </tr>
  <tr>
    <td align=" right" width=" 50%" ><img src=" IMAGE 3.jpg" width=" 50%" >
      <br><br>
      DESCRIPTION OF IMAGE 3.XYZ
    </td>
    <td width=" 50%" ></td>
  </tr>
</table>
</xhtml>
```

FIG.8

```
<svg>
    <text font-family:gothic font-size:20pt font-weight:bold font-style:italic x=X1 y=Y1>
    HEADLINE
    </text>
    <image x=X2 y=Y2 width=W1 height=H1>
    IMAGE 1.jpg
    </image>
    <text font-family:mincho font-size:10pt x=X3 y=Y3>
    DESCRIPTION OF IMAGE 1.abcdef.........
    </text>
    <image x=X4 y=Y4 width=W2 height=H2>
    IMAGE 2.jpg
    </image>
    <text font-family:mincho font-size:10pt x=X5 y=Y5>
    DESCRIPTION OF IMAGE 2.ABCDEF.........
    </text>
    <image x=X6 y=Y6 width=W3 height=H3>
    IMAGE 3.jpg
    </image>
    <text font-family:mincho font-size:10pt x=X7 y=Y7>
    DESCRIPTION OF IMAGE 3.XYZ.........
    </text>
</svg>
```

FIG.9

DESIGNATE BLOCKS TO BE
SUBJECTED TO SCALING

○ CURRENT BLOCK ONLY

● ALL TEXT BLOCKS

○ ALL TEXT BLOCKS DESIGNATED

|   | MORE THAN 60P | 6P~5P | 5P~4P | LESS THAN 4P |
|---|---|---|---|---|
| A MINCHO TYPEFACE W3 | A | A | A | D |
| B MINCHO TYPEFACE W5 | B | B | A | D |
| C MINCHO TYPEFACE W7 | C | C | A | D |
| D GOTHIC TYPEFACE W3 | D | D | D | D |
| E GOTHIC TYPEFACE W5 | E | E | D | D |
| F GOTHIC TYPEFACE W7 | F | F | D | D |
| G GYOSHO | G | G | H | D |
| H KAISHO | H | H | H | D |

FIG.19

DOCUMENT PRINTING CONTROL APPARATUS AND METHOD

This application claims priority from Japanese Patent Application Nos. 2002-272006, filed Sep. 18, 2002, and 2002-279951, filed Sep. 25, 2002, which are incorporated herein by reference.

BACKGROUND OF THE INVENTION

1. Field of the Invention

The present invention relates to a document printing control apparatus and method for printing documents.

2. Description of the Related Art

It is not unusual that HTML (hypertext markup language) data are created without considering a paper size or resolution at the output. In addition, the data are often defined in relative coordinate values or ratios so that their layout on an output sheet can be revised to cope with the change in the size of the output area by Internet Explorer, Netscape Navigator or the like.

In addition, the technique disclosed in Japanese Patent Application Laid-open No. 2002-091946, for example, detects as specific data a minimum character size in document data, when making a layout of the document data, which are described in a structured description language, on an output sheet. Then, it calculates a scaling factor to make a layout of the specific data detected, and makes the layout of the characters of the document data, which are resized in accordance with the scaling factor, on the output sheet to facilitate their intelligibility.

As for such a conventional automatic layout, since the data are generated without considering the output paper size, the output size may differ from an expected size. For example, the area to be printed can exceed the paper size of the output sheet so that the printing exceeds the output paper size. On the contrary, matching the size of the area to the output paper size can make the characters too small to read.

SUMMARY OF THE INVENTION

Therefore an object of the present invention is to solve the foregoing problems and to provide a document printing control apparatus and method capable of revising an area and font size.

Another object of the present invention is to provide a document printing control apparatus and method capable of making a layout that is suitable for an output area, and improves intelligibility of a document for any typeface and small font size specified.

According to a first aspect of the present invention, there is provided a document printing control apparatus for converting a document format file whose print layout is not determined to a document format file whose print layout is determined to make a printer perform printing, the document printing control apparatus comprising: first determination means for determining a size of an output area in accordance with an output paper size; second determination means for determining sizes of individual blocks in the output area and for determining font sizes in the individual blocks, according to the size of the output area determined by the first determination means; first placement means for placing the blocks and font charcters with the sizes determined by the second determination means; editing means for editing a layout of at least one block placed by the first placement means; and second placement means for placing the blocks and characters in accordance with the layout edited by the editing means.

Here, the editing means may comprise: designation means for specifying one of the blocks placed by the first placement means; decision means for making a decision as to whether the block specified by the designation means is a text area; and revision means for revising the size of the text area or the font size in the text area, when the decision means makes a decision that the specified block is the text area.

The second placement means may comprise acquisition means for obtaining the font size in accordance with a ratio between widths of the text area before and after the revision, wherein characters with the font size obtained by the acquisition means may be placed in the text area after the revision.

According to a second aspect of the present invention, there is provided a document printing control method of converting a document format file whose print layout is not determined to a document format file whose print layout is determined to make a printer perform printing, the document printing control method comprising: a first determination step of determining a size of an output area in accordance with an output paper size; a second determination step of determining sizes of individual blocks in the output area and of determining font sizes in the individual blocks, according to the size of the output area determined by the first determination step; a first placement step of placing the blocks and characters with the sizes determined by the second determination step; and a second placement step of placing, when at least one block placed has its layout edited, the blocks and characters in accordance with the layout edited.

Here, the second placement step may comprise an acquisition step of obtaining the font size in accordance with a ratio between widths of a text area before and after a revision, wherein characters with the font size obtained by the acquisition step may be placed in the text area after the revision.

According to a third aspect of the present invention, there is provided a computer-readable recording medium storing a program causing a computer to execute the program of converting a document format file whose print layout is not determined to a document format file whose print layout is determined to make a printer perform printing, the program comprising: a first determination procedure of determining a size of an output area in accordance with an output paper size; a second determination procedure of determining sizes of individual blocks in the output area and of determining font sizes in the individual blocks, according to the size of the output area determined by the first determination procedure; a first placement procedure of placing the blocks and characters with the sizes determined by the second determination procedure; and a second placement procedure of placing, when at least one block placed has its layout edited, the blocks and characters in accordance with the layout edited.

Here, the second placement procedure may comprise an acquisition procedure of obtaining the font size in accordance with a ratio between widths of a text area before and after a revision, wherein characters with the font size obtained by the acquisition procedure may be placed in the text area after the revision.

According to a fourth aspect of the present invention, there is provided a document printing control apparatus for converting a document format file whose print layout is not determined to a document format file whose print layout is determined to make a printer perform printing, the document printing control apparatus comprising: first determination means for determining a size of an output area in accordance with an output paper size; second determination means for determining a block size in the output area and for determining a font size in the block, according to the size of the output area determined by the first determination means; and scaling means for scaling the block size and font size in accordance with the block size and font size determined by the second determination means.

Here, the scaling means may comprise: scaling factor determination means for determining a scaling factor of the block size and the font size determined by the second determination means; calculation means for calculating font sizes of individual blocks in accordance with the scaling factor determined by the scaling factor determination means; decision means for making a decision as to whether a minimum font size of the font sizes calculated by the calculation means is greater than a predetermined font size; and means for calculating a scaling factor for increasing the minimum font size to the predetermined font size, when the decision means makes a decision that the minimum font size is smaller than the predetermined font size.

The document printing control apparatus may further comprise typeface substitution means for replacing the font subjected to the scaling by the scaling means by an alternative typeface.

The typeface substitution means may replace a Mincho typeface with a Gothic typeface.

According to a fifth aspect of the present invention, there is provided a document printing control method of converting a document format file whose print layout is not determined to a document format file whose print layout is determined to make a printer perform printing, the document printing control method comprising: a first determination step of determining a size of an output area in accordance with an output paper size; a second determination step of determining a block size in the output area and for determining a font size in the block, according to the size of the output area determined by the first determination step; and a scaling step of scaling the block size and font size in accordance with the block size and font size determined by the second determination step.

The scaling step may comprise: a scaling factor determination step of determining a scaling factor of the block size and the font size determined in the second determination step; a calculation step of calculating font sizes of individual blocks in accordance with the scaling factor determined by the scaling factor determination step; a decision step of making a decision as to whether a minimum font size of the font sizes calculated by the calculation step is greater than a predetermined font size; and a step of calculating a scaling factor for increasing the minimum font size to the predetermined font size, when the decision step makes a decision that the minimum font size is smaller than the predetermined font size.

Here, the document printing control method may further comprise a typeface substitution step of replacing the font subjected to the scaling in the scaling step by an alternative typeface.

The typeface substitution step may replace a Mincho typeface with a Gothic typeface.

According to a sixth aspect of the present invention, there is provided a computer readable recording medium for storing a program causing a computer to execute the program of converting a document format file whose print layout is not determined to a document format file whose print layout is determined to make a printer perform printing, the program comprising: a first determination procedure of determining a size of an output area in accordance with an output paper size; a second determination procedure of determining a block size in the output area and for determining a font size in the block, according to the size of the output area determined by the first determination procedure; and a scaling procedure of scaling the block size and font size in accordance with the block size and font size determined by the second determination procedure.

Here, the scaling procedure may comprise: a scaling factor determination procedure of determining a scaling factor of the block size and the font size determined by the second determination procedure; a calculation procedure of calculating font sizes of individual blocks in accordance with the scaling factor determined by the scaling factor determination procedure; a decision procedure of making a decision as to whether a minimum font size of the font sizes calculated by the calculation procedure is greater than a predetermined font size; and a procedure of calculating a scaling factor for increasing the minimum font size to the predetermined font size, when the decision procedure makes a decision that the minimum font size is smaller than the predetermined font size.

The program may cause the computer to execute a typeface substitution procedure of replacing the font subjected to the scaling in the scaling procedure by an alternative typeface.

The typeface substitution procedure may replace a Mincho typeface with a Gothic typeface.

The foregoing configurations in accordance with the present invention can revise the areas and font sizes even after assigning the areas.

In addition, the foregoing configurations enable the layout suitable for the output area.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a diagram illustrating contents of an XHTML document;

FIG. 9 is a diagram illustrating contents of an SVG document;

FIG. 16 is a diagram illustrating an example of a user interface (UI);

FIG. 19 is a diagram showing a table of correspondence between typeface replacements;

DETAILED DESCRIPTION OF PREFERRED EMBODIMENTS

The invention will now be described with reference to the accompanying drawings.

First Embodiment

Figure 1:
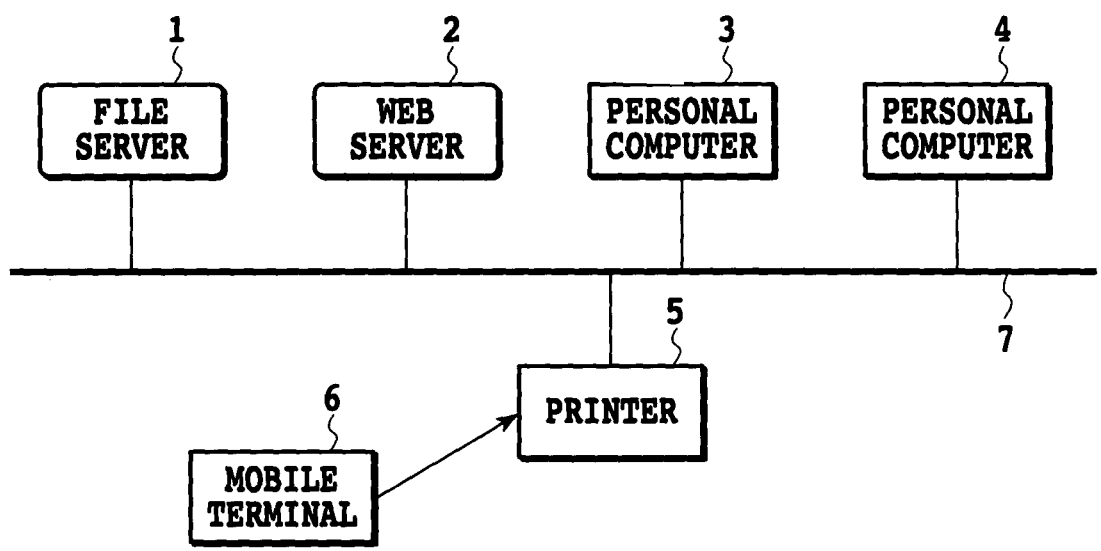
FIG. 1 is a block diagram showing a configuration of an embodiment in accordance with the present invention.

FIG. 1 shows a configuration of an embodiment in accordance with the present invention. It shows an example of a document printing system. The document printing system includes a plurality of personal computers (called "client personal computers" from now on) 3 and 4, a file server 1, a Web server 2 and at least one printer 5 capable of processing XML (Extensible Markup Language) data, which are interconnected to one another via a network 7.

The printer 5 is directly connected to a mobile terminal 6 such as a mobile information terminal via an IrDA (Infrared Data Association), RS-232C or Centronics interface without passing through the network 7.

Instead of the client personal computers 3 and 4, it is possible to connect information processing equipment such as wordprocessor, workstations or mobile information terminals.

The client personal computers 3 and 4 and file server 1 each store a plurality of font data sets, Web data, image data and the like.

The mobile terminal 6 or the client personal computer 3 or 4 sends to the printer 5 a printing request including the URL (Uniform Resource Locator) of a Web and the number of copies to be printed, and the printer 5 sends a file request to the Web server. The Web server collects the required document data, font data and the like from the file server, and transfers the data to the printer 5. The printer 5 develops the data and prints them.

In this embodiment, the printing apparatus may be configured by the printer 5 and any one of Web server 2, the personal computers 3 and 4, and the mobile terminal 6.

Figure 2:
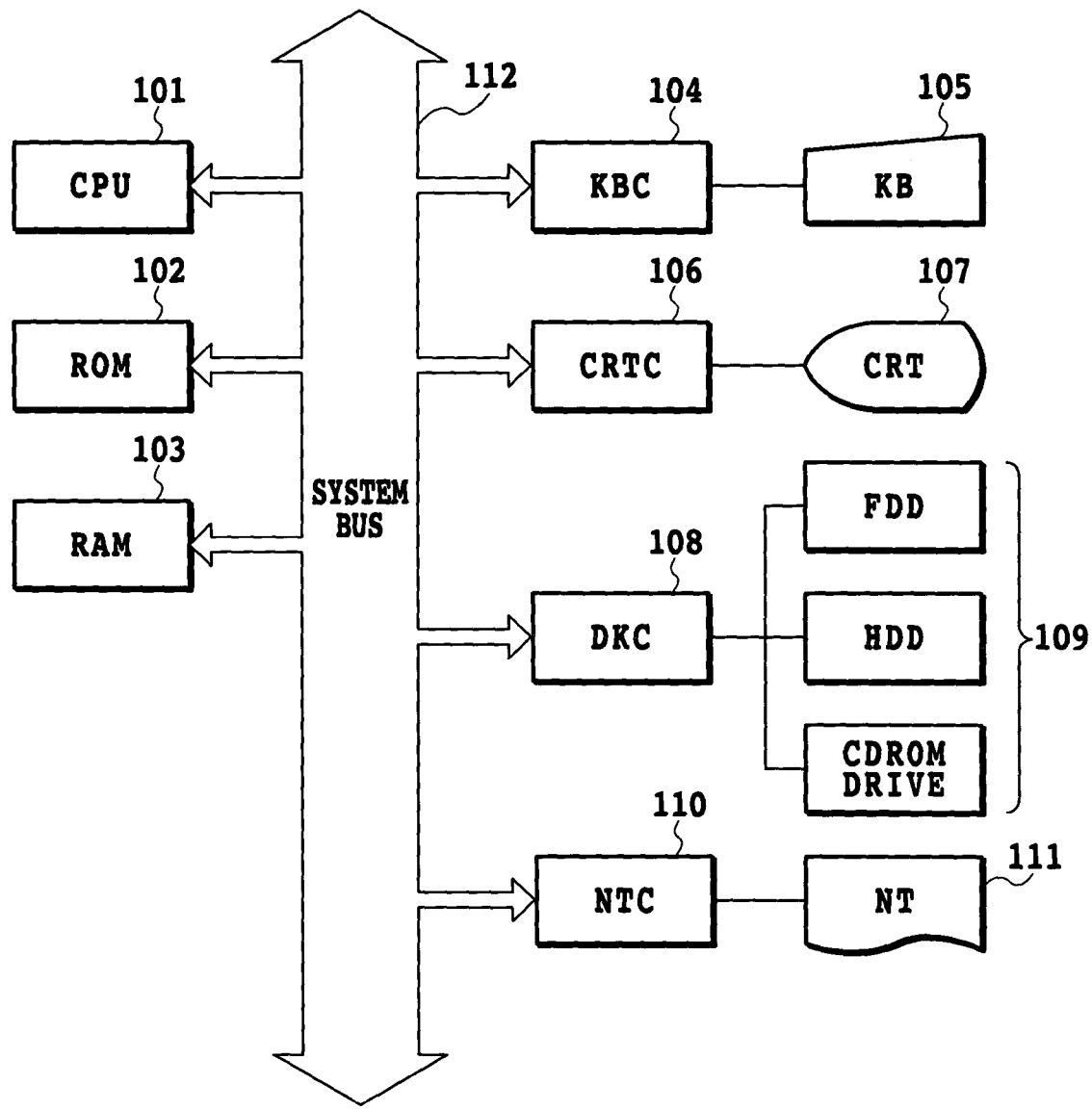
FIG. 2 is a block diagram showing a schematic configuration of a client personal computer, file server and Web server of FIG. 1.

FIG. 2 is a schematic diagram showing a configuration of the client personal computers 3 and 4, file server 1 and Web server 2 of FIG. 1. In FIG. 2, a CPU (central processing unit) 101 carries out control and computing processing of the entire apparatus. A ROM (read only memory) 102 stores a system boot-up program, basic I/O programs, character pattern data (font data) for converting character codes to bit patterns and so forth. A RAM (random access memory) 103 temporarily stores data the CPU 101 uses for computation, computation results, character pattern data strings converted from the character codes to be displayed and so on.

A keyboard controller (KBC) 104 receives key input data (character codes or control codes) from a keyboard (KB) 105, and transfers the data to the CPU 101. A display controller (CRTC) 106 reads the character pattern data strings stored in the RAM 103, and transfers them to the CRT 107. The display unit (CRT) 107 receives the character pattern data strings from the CRTC 106 and displays them on a display screen.

A disk controller (DKC) 108 controls access to external storage 109. As the external storage 109, a floppy disk drive (FDD), hard disk drive (HDD) and CD-ROM dive can be used. The HD stores a character development processing program for reading the character pattern data (font data) or font data, and for converting the data to bit map data. The external storage such as the FD or CD-ROM supplies application programs and their related data.

A network controller (NTC) 110 control the operation of a network terminal (NT) 111. A system bus 112 transfers data between the foregoing components.

Figure 3:
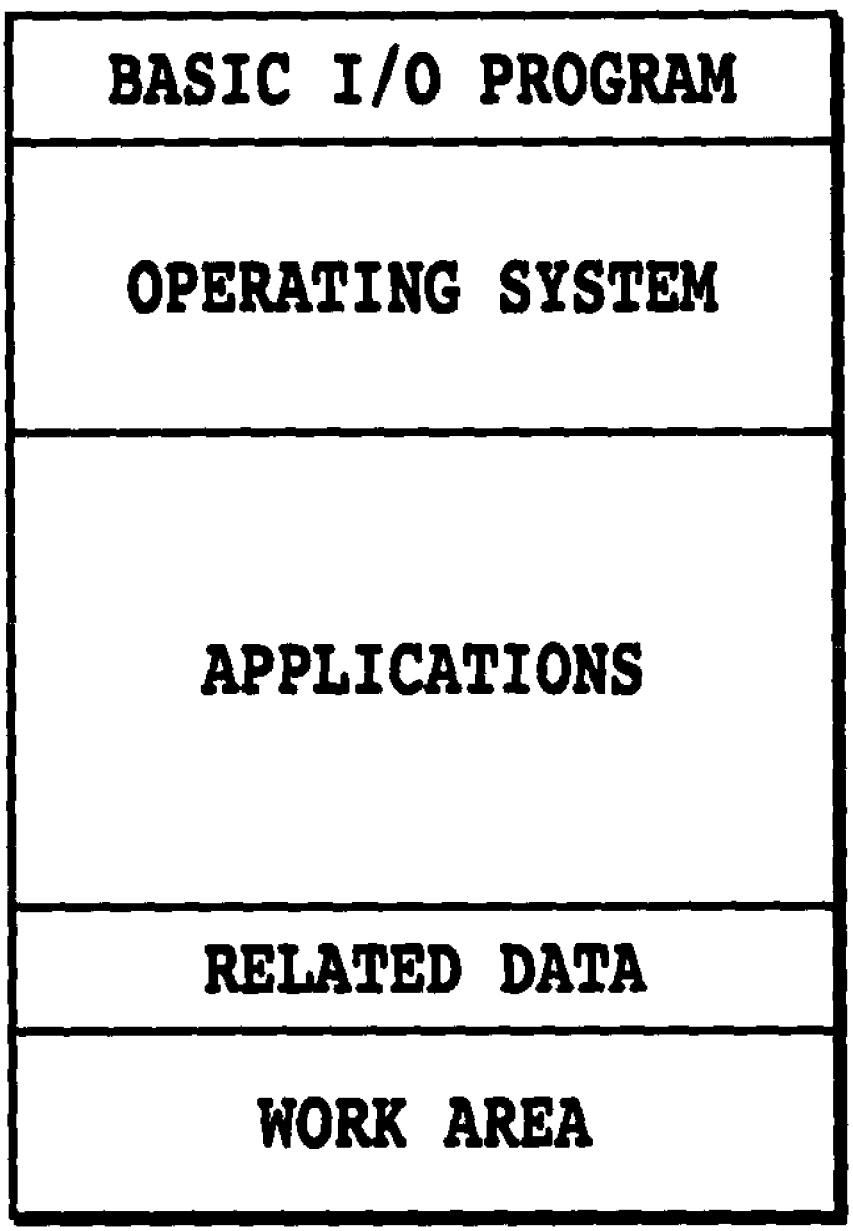
FIG. 3 is a schematic diagram showing a memory map of a RAM of FIG. 2.

FIG. 3 shows a memory map of the RAM 103 of FIG. 2. The basic I/O program is read into the RAM 103 by the system boot-up program in the ROM 102. The application programs and related data can be executed by installing them once from the FD or CD-ROM to the HD in the external storage 109, and then by loading them from the HD to the RAM 103 during power-up. They can also be executed by loading them directly from the FD or CD-ROM to the RAM 103 without installing them in the HD. In the file server 1, a printer information table, which will be described below, is formed in an area of the related data.

Figure 4:
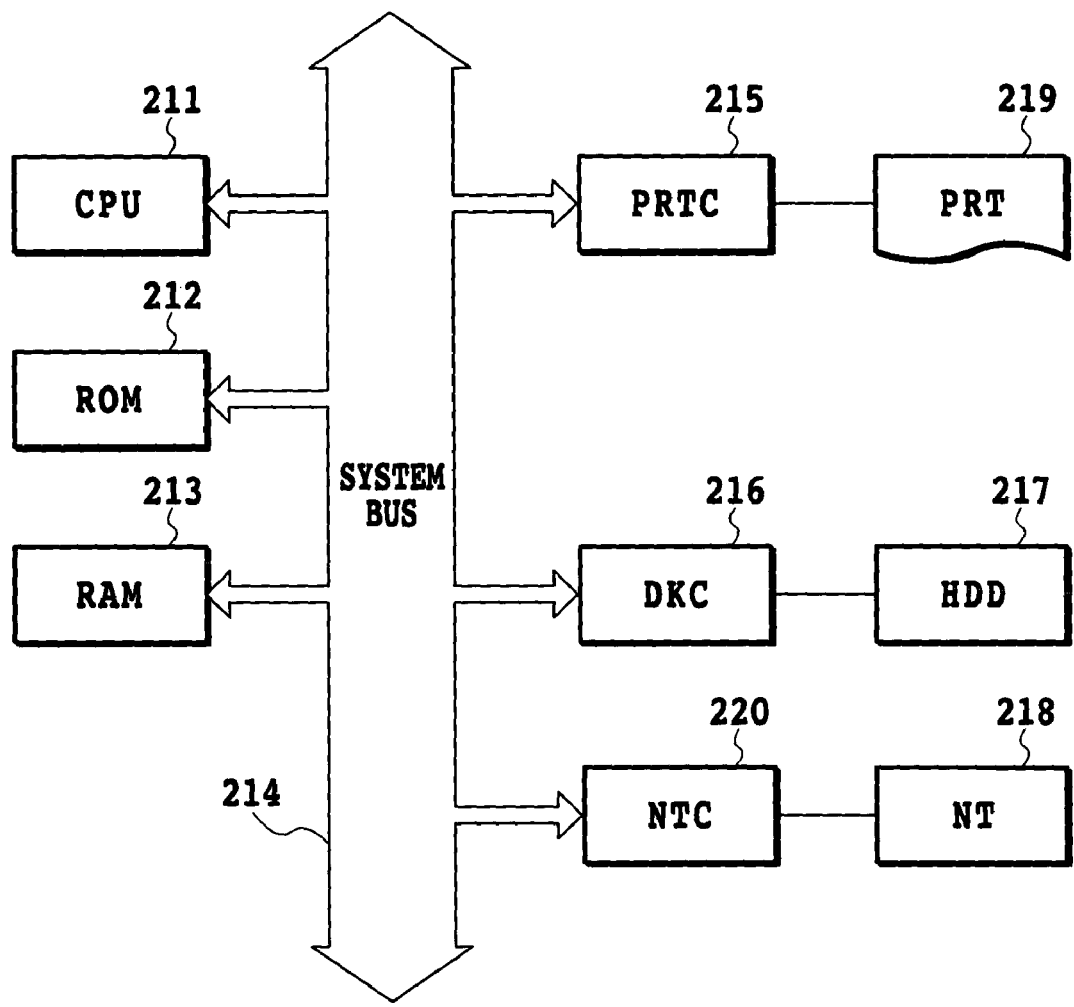
FIG. 4 is a block diagram showing a configuration of a printer of FIG. 1.

FIG. 4 shows a configuration of the printer 5 of FIG. 1. As the printer 5, any of a laser-beam printer, bubble jet (registered trademark) printer or thermal transfer printer can be used as long as they have power to process XML format data.

The printer 5 includes a CPU 211, a ROM 212, a RAM 213, a printer controller (PRTC) 215, a printer engine (PRT) 219, a disk controller (DKC) 216, a hard disk drive (HDD) 217, a network controller (NTC) 220 and a network terminal (NT) 218, which are interconnected with one another via a system bus 214.

The DKC 216 and HDD 217 can be removed depending on the type of the printer.

The CPU 211, which controls the entire apparatus, executes various processings necessary for the print in accordance with the programs stored in the ROM 212 using the RAM 213 as a work area. The system bus 214 is a passage for exchanging data and control signals between the individual components. The ROM 212 stores the character pattern data (font data) and the like. The RAM 213 or HDD 217 stores data such as document data, image data or font data which are downloaded from the Web server 2 in response to a request to the Web server 2.

The CPU 211 generates character pattern data or image data (bit map data) from the document data, image data or font data fed from the Web server 2 in accordance with the programs in the ROM 212, and develops the data in a print buffer in the printer controller 215. The printer controller 215 supplies the printer engine 219 with a print control signal generated from the bit map data.

The network controller 220 controls the operation of the network terminal (NT) 218 when exchanging data between the client personal computers 3 and 4 and file server 1 via the network 7.

Figure 5:
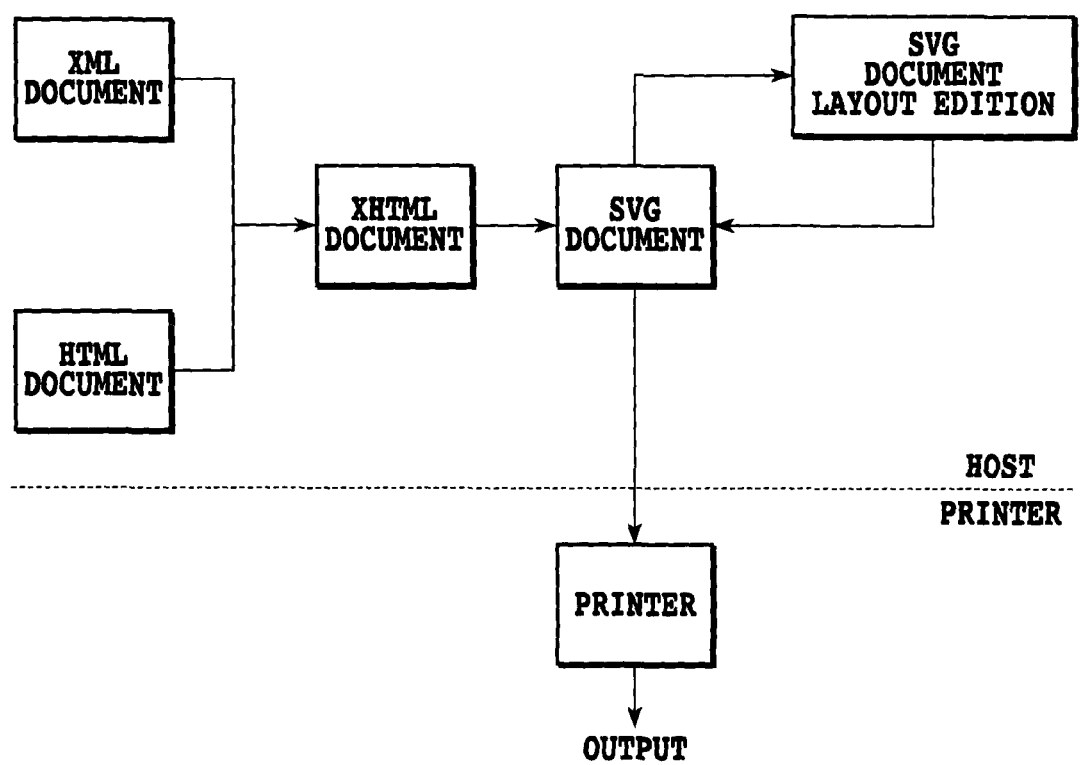
FIG. 5 is a block diagram illustrating a file conversion processing of a first embodiment in accordance with the present invention.

FIG. 5 shows a flow of the file conversion processing. The processing is divided to host side processing and printer side processing. The host side processing is carried out on the Web server 2 or by the client personal computer 3 or 4 of FIG. 1. First, the file server reads a document stored in the XML format or HTML format, and converts it into XHTML (Extensible HyperText Markup Language) format data. As for the document stored in the XML format or HTML format, its print layout has not yet been determined. Subsequently, the XHTML format data is converted to SVG (Scalable Vector Graphic) for making a suitable layout based on the output paper size and resolution according to the flowchart illustrated in FIG. 6. However, the document subjected to the automatic layout may differ from a desired output of a user.

In such a case, the print image of the document is displayed and it undergoes the automatic layout on the personal computer screen to enable the user to revise it to a desired output format and to edit the layout itself on the display screen. Thus, it outputs the edited result to the printer as a new SVG document. The detail of the layout editing will be described later with reference to the flowchart of FIG. 7.

Incidentally, the XHTML and SVG contents are described in W3C technical report. Basically, the XHTML is an expansion of the grammar of the HTML according to the XML format, and is more suitable for the display. On the other hand, the SVG is similar to the grammar of a page description language such as PS (PostScript), is subjected to XML expansion, and is suitable for an output format. Therefore, the HTML or XML document data are once converted into XHTML document data, and then assigned the output paper size and resolution and converted to the SVG format data. The SVG data are transferred to the printer capable of interpreting the SVG in an SVG file. Thus, the document data written in the XML or HTML undergo the layout and are output appropriately.

Figure 6:
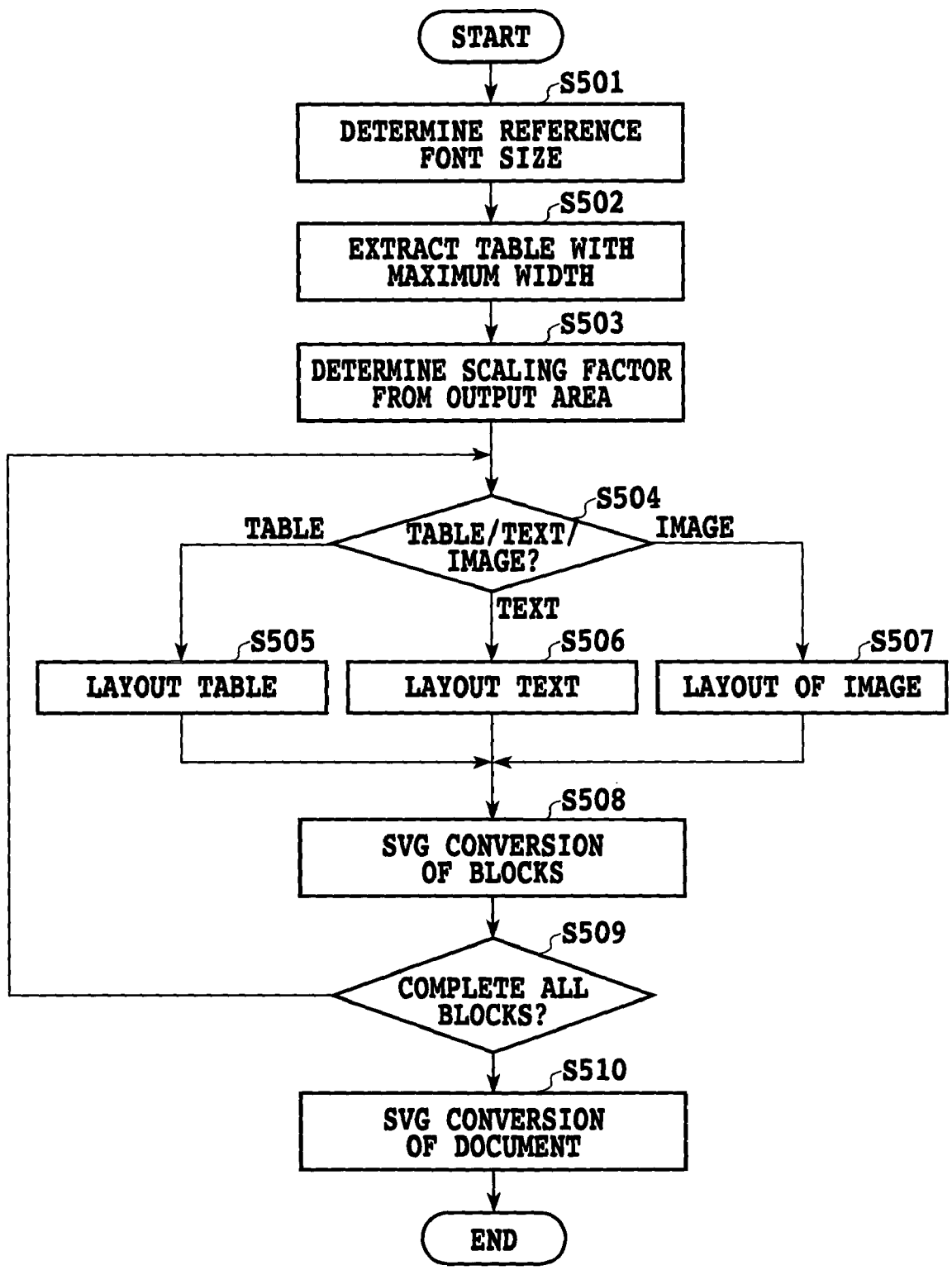
FIG. 6 is a flowchart illustrating the operation of a control program stored in the ROM of FIG. 2, an example of a control program for converting XHTML format document data to SVG format document data.

FIG. 6 is a flowchart illustrating processing of the control program stored in the ROM 102 of FIG. 2, an example of the control program for converting the XHTML format document data to the SVG format document data. At step S501, the control program acquires a reference font size for the conversion from the XHTML format data, the conversion source. The reference font size is not specified in the XHTML file. Accordingly, each browser usually determines the reference font size independently. Here, it determines a value such as a 10 point or 10.5 point as the reference font size on the output sheet. When the XHTML document specifies the reference font size, the value is adopted as the reference font size.

At step S502, the control program checks the whole XHTML document whether it includes a table attribute. When no table attribute is present, the width of a sheet or screen to be output becomes the reference width of a tag constituting individual XHTML elements. In contrast, when the table attribute is present, the control program compares the contents of the individual tables. For example, when the <TABLE> element of the XHTML includes a width attribute, the value defines the width of the table. Accordingly, the maximum value among such values is selected. If the <TABLE> element does not include the width attribute, the width of the output area becomes the width of the table.

At step S503, the control program calculates the scaling factor of the output area from the maximum value of the tables obtained at step S502. It can be computed from the ratio between the width of the output area and the maximum width of the tables obtained at step S502. In other words, the scaling factor equals the width of the output area/the maximum width of the tables.

Then, the control program calculates the placement of the individual elements and the placement of the characters in the individual elements from step S504 onward.

At step S504, the control program makes a decision as to whether the target element is a table element, text element or image element. The table element includes <TABLE>, <TR>, <TH>, <TD>, <CAPTION>, <THEAD>, <TFOOT>, <TBODY> and the like. The text element includes <H1>-<H6>, <P>, <Q>, <BLOCKQUOTE>, <EM>, <STRONG>, <SUP>, <SUB> and so on. The image element includes <IMG>, <MAP>, <AREA>, <OBJECT>,<APPLET> etc. As for the meanings of the elements, refer to the specification of the XHTML or the HTML as described by the World Wide Web Consortium.

If it makes a decision that the target element is a table element at step S504, the control program proceeds to step S505 to carry out placement in the table, the details of which will be described later with reference to the flowchart of FIG. 10.

If it makes a decision that the target elements is a text element at step S504, the control program proceeds to step S506, and decides the placement of the individual characters in the text element.

The text area is divided into a block element and inline element. The block element includes <H1>-<H6>, <P> element and the like, and the inline element includes <EM>, <STRONG> and so on. The inline element serves as a slave element of the block element to emphasize a character string in a sentence or to change a color.

As for a placement method of the block element of the text, it decides the width of the text area, first. Here, the width of the master element of the text element is the width of the text area. For example, when the master element is <XHTML>, since it is the highest element, the width of the paper or screen to be output is set as the width of the text area.

As for the size of the characters, when it is specified by the CSS property of the W3C specification, the control program determines the character size by multiplying the specified value by the scaling factor obtained at step S503. In particular, unless the character size is specified, the control program determines the character size by multiplying the standard character size obtained at step S501 by the scaling factor obtained at step S503. The control program stores the character size determined here to check whether it is greater than the minimum size it sets in advance at step S510.

Then, the control program places the characters one by one in the character size determined, returns the position of the character to the initial position at the point of exceeding the width, and continues to place the characters from the initial position of the next line.

Then, completing the placement of the characters, the control program calculates the height of the area from the number of lines and font size. In this case, if the line spacing is specified by the CSS property, it is used. Otherwise, the line spacing is determined with reference to the height of the characters.

As for a placement method of the inline elements in the text, the end point of the placement position of the first previous character of the character string specified as the inline is adopted as the reference point, from which they are placed in the character type and character size specified for the elements according to the pitch information of the individual characters.

In contrast, when the control program makes a decision at step S504 that the target element is an image element, it proceeds to step S507 to decide the area and location of the image element. As for the method of deciding the size of the image area, it obtains it by multiplying the size of the image area specified in the XHTML document by the scaling factor obtained at step S503.

Figure 7:
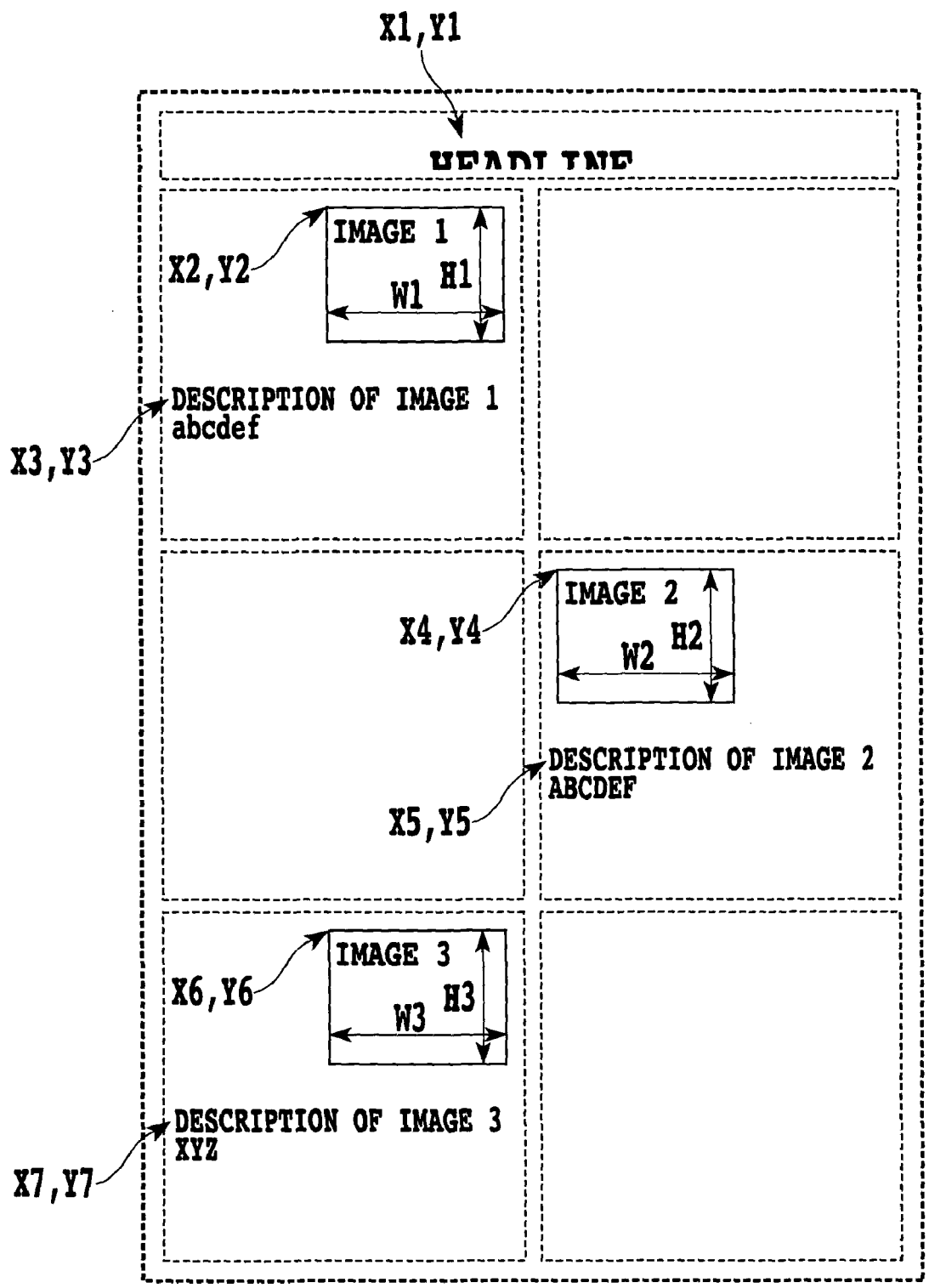
FIG. 7 is an image diagram illustrating a document.

Then, at step S508, the control program converts the contents of the individual elements obtained from step S505 to step S507 to the SVG data. In this case, the text elements are converted into <tspan>, and the image elements are converted into <image>. For example, the data with the layout as shown in FIG. 7 are represented in the form of an XHTML document as shown in FIG. 8, and are represented as shown in FIG. 9 in the SVG notation.

At step S509, the control program checks whether the processing from step S505 to step S507 has been completed for all the elements. When the processing has not been completed, the control program returns to step S504 to compute the location of each element. If it completes the processing of all the elements, the control program proceeds to step S510.

After completing the calculation of the locations of all the elements, the control program encloses the entire document by <svg> and </svg>, defines a style sheet by <style> element as needed, and completes producing the SVG document at step S510.

Figure 10:
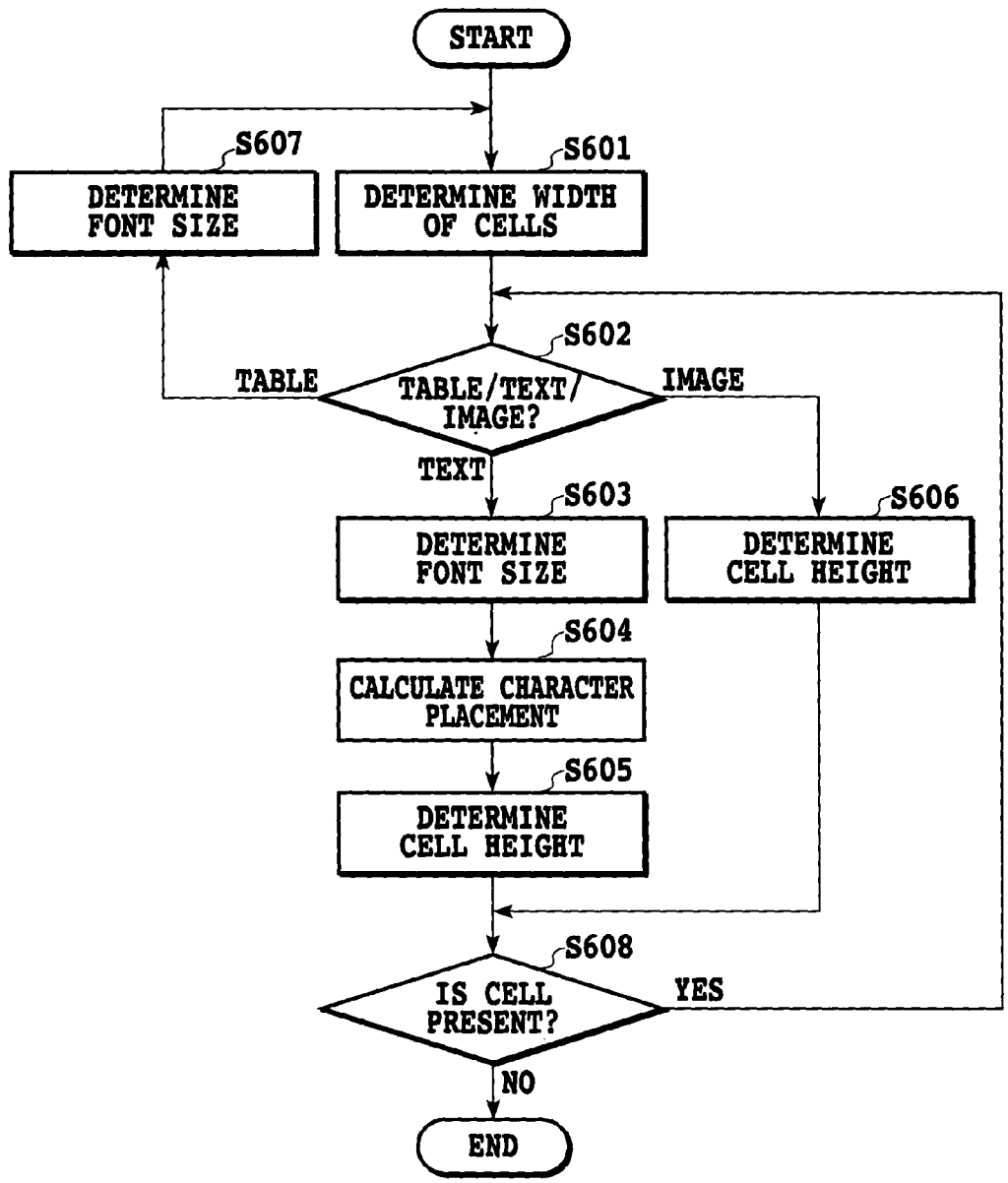
FIG. 10 is a flowchart illustrating step S505 of FIG. 6 in more detail.

FIG. 10 is a flowchart illustrating the processing of step S505 of FIG. 6, the calculation of the placement of the contents of the table, in more detail. At step S601, the control program calculates the width of each cell in the table. As for the calculation method, it sums up the widths of the individual cells enclosed by a <TR> element, divides the width of the table element which is the master element in accordance with the ratios of the widths of the cells, and assigns the divisions to the individual cells. For example, assume that there are three cells as the slave elements of the table in the XHTML document, that the widths of the cells 1, 2 and 3 are 10, 20 and 10, respectively, and that the width of the table of the master element is 100. In this case, the width of the cell 1 becomes 100×(10/(10+20+10))=25. Likewise, the width of the cell 2 becomes 50, and that of the cell 3 becomes 25.

At step S602, the control program checks the contents of the individual cells. The contents of the individual cells consist of one of the table, text and image.

The decision method is similar to that described at step S504. The control program makes a decision that the element is a table element when it is one of <TABLE>, <TR>, <TH>, <TD>, <CAPTION>, <THEAD>, <TFOOT>, <TBODY> and the like, and proceeds to step S607, at which it calculates the scaling factor, again. Then, it returns to step S601 to carry out the processing of the next table element.

On the other hand, the control program makes a decision that the element is a text element when it is one of <H1>-<H6>, <P>, <Q>, <BLOCKQUOTE>, <EM>, <STRONG>, <SUP>, <SUB> and the like, and proceeds to step S603. In contrast, it makes a decision that the element is an image element when it is one of <IMG>, <MAP>, <AREA>, <OBJECT>, <APPLET> and the like, and proceeds to step S606.

When the control program makes a decision that the element is the text element, it carries out the processing from step S603 to step S605, through which it decides the placement of the individual characters in the text element.

The text area is divided into block element and inline element. The block element includes <H1>-<H6>, <P> element and so on. The inline element includes <EM>, <STRONG> and so forth. The inline element serves as a slave element of the block element to emphasize a character string in a sentence, or to change a color.

As for a placement method of the block element of the text, it captures the width of the text area, first. Here, the width of the cell determined at step S601 becomes the width of the target text to be handled here.

As for the size of the characters at step S603, when it is specified by the CSS property of the W3C specification, the control program determines the character size by multiplying the specified value by the scaling factor obtained at step S503 or step S607. In particular, unless the character size is specified, the control program determines the character size by multiplying the standard character size obtained at step S501 by the scaling factor obtained at step S503 or step S607.

Then the control program stores character size determined here to check whether it is greater than the minimum size set in advance at step S510.

Then, at step 604, the control program places the characters one by one in the character size determined, returns the position of the character to the initial position at the point of exceeding the width, and continues to place the characters from the initial position of the next line. As for a placement method of the inline elements of the text, the end point of the placement position of the first previous character of the character string specified as the inline is adopted as the reference point, from which they are placed in the character type and character size specified for the elements according to the pitch information of the individual characters.

Then, completing the placement of all the characters, the control program calculates the height of the area from the number of lines and font size at step 605. In this case, if the line spacing is specified by the CSS property, it is set. Otherwise, the line spacing is determined with reference to the height of the character.

In contrast, when the control program makes a decision at step S602 that the target element is an image element, it proceeds to step S606 to decide the area and placement of the image element. As for the method of deciding the size of the image area, it obtains its height by applying the aspect ratio of the size specified in the XHTML document as to the image area to the width of the cell obtained at step S601.

On the other hand, when the control program makes a decision that the cell further includes a table element at step S602, it must convert the table size at step S607 such that the table size does not exceed the cell size obtained at step S601, in which the cell is to become the master element of that table. The scaling factor is given by the following expression: the scaling factor=(scaling factor of the table of the master element)×(the width of the table)÷(the width of the cell which is the master element).

At step S608, the control program checks whether any other cell to be processed remains. If such a cell is present, the control program returns to step S602 to execute similar processing, and if no cell is present, it terminates the processing.

Figure 11:
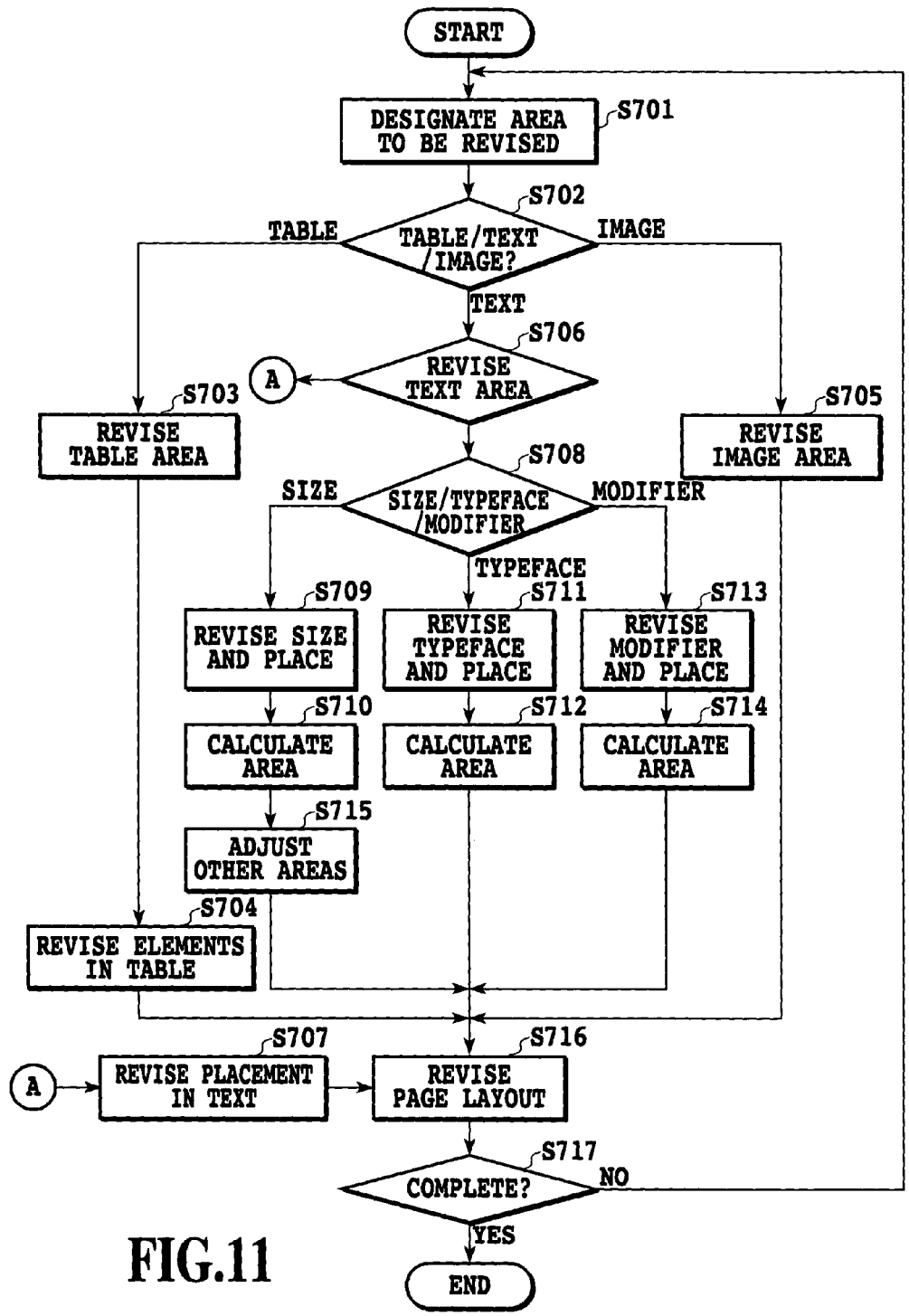
FIG. 11 is a flowchart illustrating an example of a layout editing procedure on a screen displaying a print image.
Figure 12:
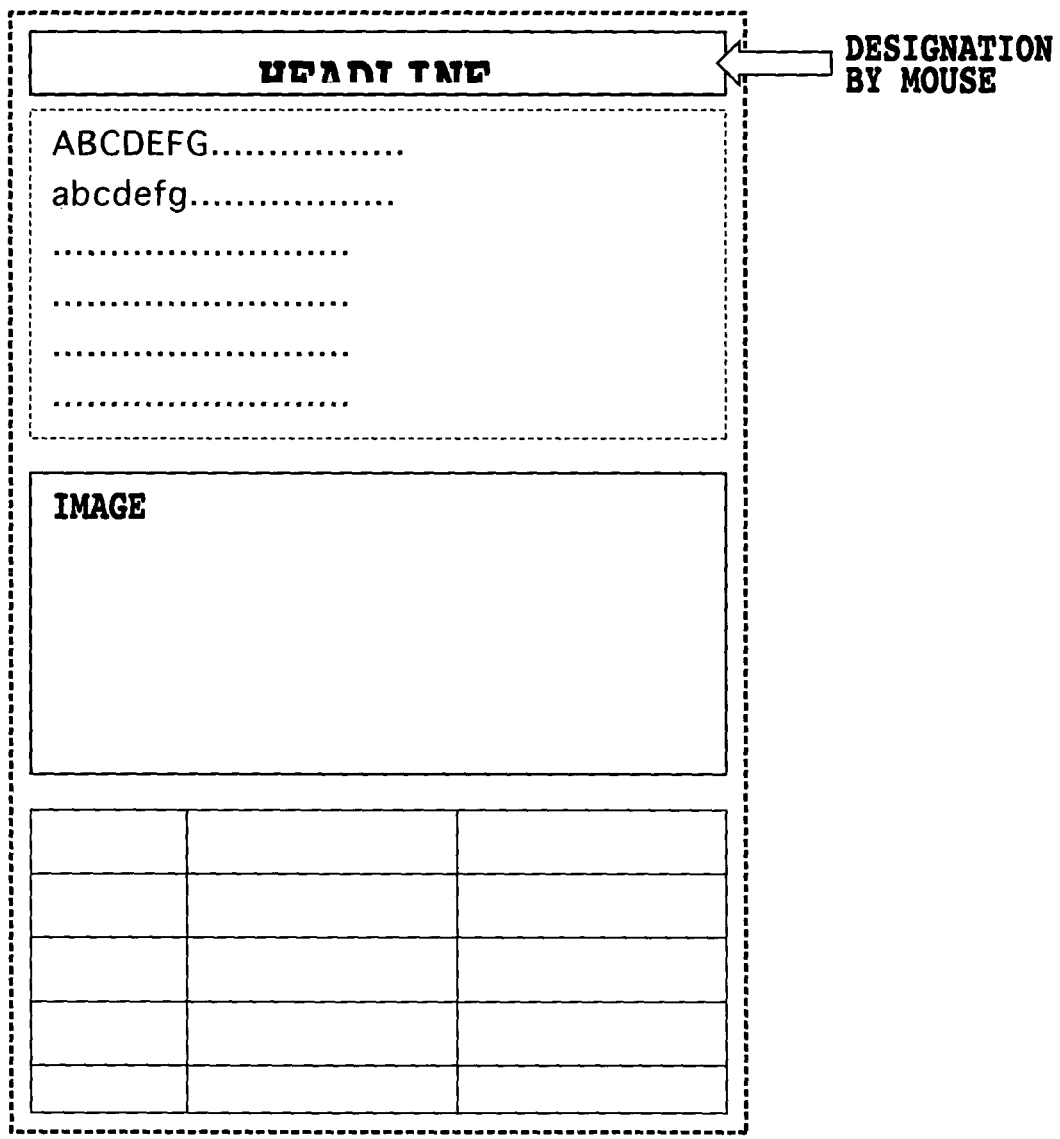
FIG. 12 is a diagram illustrating an area designation in a layout revision.

FIG. 11 is a flowchart illustrating an example of a layout editing procedure on the screen displaying a print image. As to the layout image of the current SVG document displayed on the screen, the layout editing procedure specifies an area as shown in FIG. 12 with a mouse or the like in order to edit the layout of each area of the table, text and image at step S701.

At step S702, the layout editing procedure makes a decision as to whether the specified area is a table area, text area or image area. The layout editing procedure proceeds to step S703 when the specified area is a table area, to step S705 when it is an image area, and to step S706 when it is a text area.

When the specified area is a table, the layout editing procedure revises the area by increasing or decreasing the area of the entire table at step S703. As for the area revision method in this case, it will be possible to use a drag function of the mouse, or to input a value directly on the UI (user interface) screen. However, further referring to the specifying method is avoided here.

At step S704, the layout editing procedure revises the contents of the cells in accordance with the revised area. First, it compares the entire area after the revision with that before the revision to obtain the scaling factor, and applies the scaling factor to the contents of the individual cells. For example, when the content of the cell is a text, the same scaling factor is applied to the placement, font size and the like of the individual characters within the cell. On the other hand, when the content of the cell is an image, the layout editing procedure applies the same scaling factor to the width and height of the image area.

When the specified area is an image, the layout editing procedure increases or decreases the image area at step S705 to revise the width and height of the image area in accordance with the ratio of the original image area and the revised image area.

The processing from step S706 to step S714 relates to are vision of the text area. First, at step S706, the layout editing procedure checks whether it relates to the revision of the text area. If it relates to the revision of the text area, the layout editing procedure proceeds to step S707. In contrast, if it relates to the revision of the items other then the text area such as the font size and typeface, the layout editing procedure proceeds to step S708.

The layout editing procedure proceeds to step S707 when the text area must be revised. It applies the ratio between the widths of the original and revised text areas to the font size of the individual characters. After the new font size is defined, the layout editing procedure calculates the placement location of the text area, and carries out the placement according to the new character size. After completing the placement, the layout editing procedure makes a decision as to whether the height of the area after the placement is smaller than that of the revised text area. If it is so, the layout editing procedure uses the height of the revised text area as the height of the new text area. In contrast, when the height of the area after the placement is greater than that of the revised text area, the layout editing procedure uses the height of the area after the placement as the height of the new text area.

The processing from step S708 to step S714 is a procedure when the revision is designated for the font size, typeface or modifier rather than the revision of the area.

At step S708, the procedure proceeds to step S709 when the revision is designated for the font size, to step S711 when the revision is designated for the typeface, and to step S713 when the revision is designated for modifier characters such as a bold or italicized character.

When the revision is designated for the font size, the procedure does not revise the width of the original text area at step S709, but places the characters one by one according to the new specified font size. The character is returned to the initial position when its position exceeds the width. In this case, the procedure calculates the scaling factor for converting from the original size to the new specified size in advance to be used at a subsequent step S715. When all the character strings have been placed, the procedure obtains the height of the area at step S710, which becomes the new height of the text area. At step S715, the procedure obtains the ratio between the point sizes before and after the revision according to the point size revised at step S709, and revises the sizes of the characters in the other character areas according to the ratio at the same time. The detail of the processing will be described later with reference to the flowchart of FIG. 15.

On the other hand, when the revision is designated for the typeface, the procedure does not revise the width of the original text area at step S711, but places the characters one by one according to the newly specified typeface. The character is returned to the initial position when its position exceeds the width. When all the character strings have been placed, the procedure obtains the height of the area at step S712, which becomes the new height of the text area.

In addition, when the revision is designated for the font modifier such as bold or italicized characters, the procedure does not revise the width of the original text area, but places the characters one by one according to the newly specified font at step S713. The character is returned to the initial position when its position exceeds the width. When all the character strings have been placed, the procedure obtains the height of the area at step S714, which becomes the new height of the text area.

Figure 13:
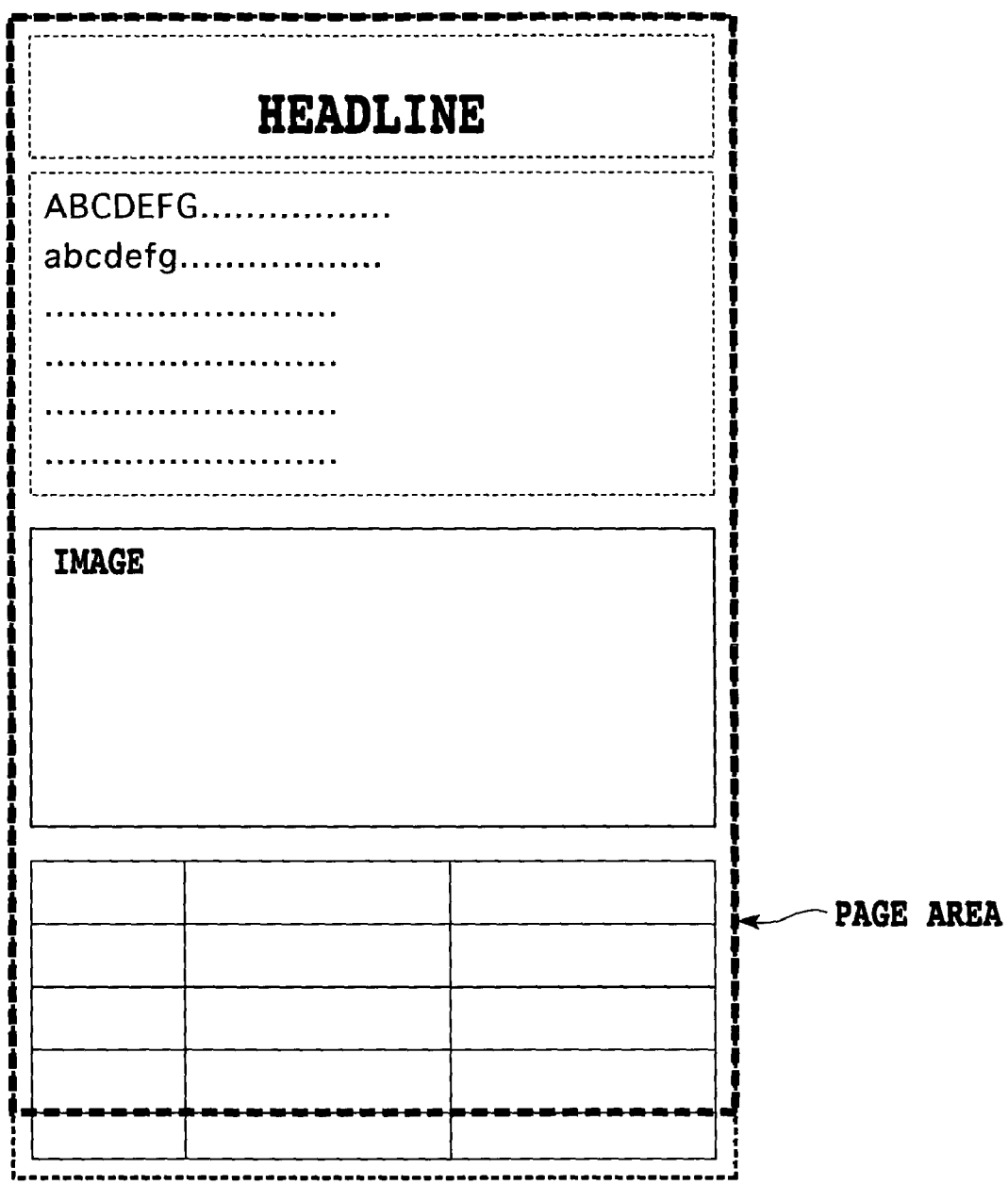
FIG. 13 is a diagram illustrating a layout adjustment.
Figure 14:
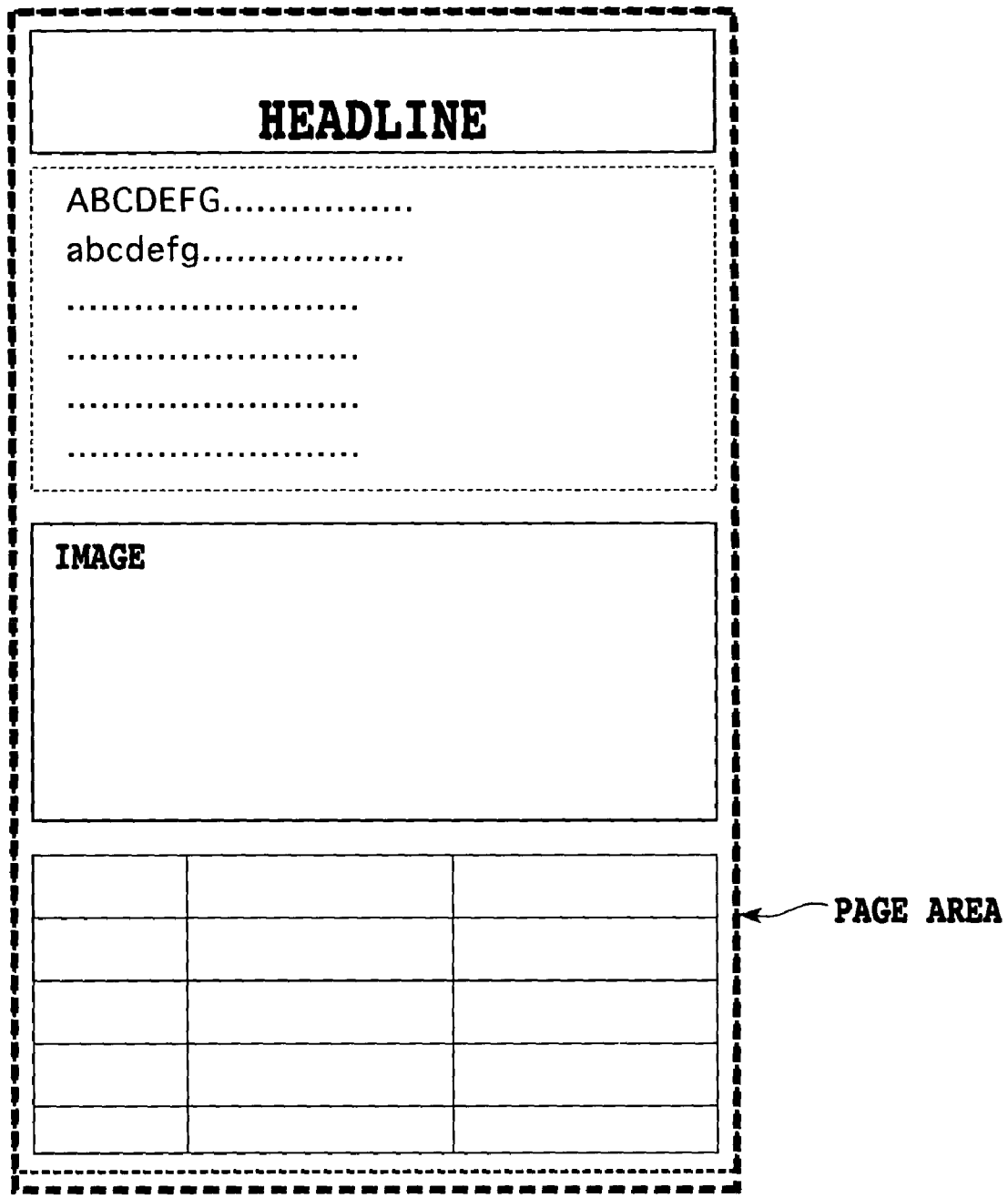
FIG. 14 is a diagram illustrating a layout adjustment.

At step S716, the procedure produces a new page layout with reflecting the revised area in the entire area. FIGS. 13 and 14 illustrate an example of the revision. FIG. 13 illustrates an example in which, since the size of the characters of the title "headline" is increased and the page area is exceeded, the table area is designated. FIG. 14 illustrates an example that adjusts the table area exceeding the page area as illustrated in FIG. 13 to place the contents within a single page.

Subsequently, if the user accepts the present layout at step S717, the procedure completes its processing. Otherwise, the procedure returns to step S701 to carry out a new area conversion by designating the same or another area.

Figure 15:
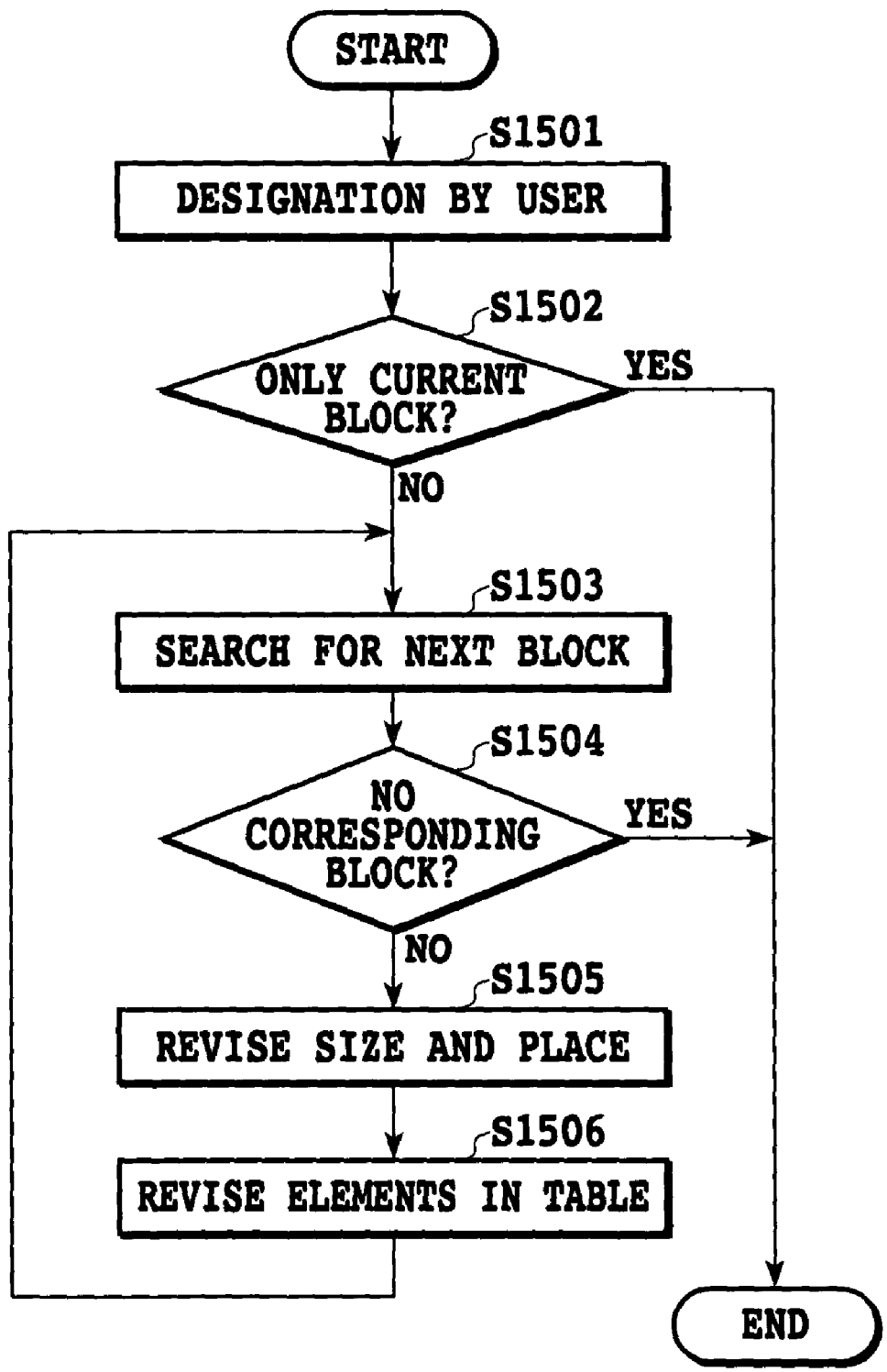
FIG. 15 is a flowchart illustrating step S715 of FIG. 11 in more detail.

FIG. 15 is a flowchart illustrating the processing of step S715 of FIG. 11 in more detail, which revises the character sizes in the other character areas at the same time. At step S1501, the processing displays a UI as shown in FIG. 16 to have the user select one of the following three methods (1)-(3). (1) Revise the character size of the current block only. (2) Revise the character sizes of all the blocks specified by a tag of a text element such as <P>, <Q>, <BLOCKQUOTE>, <EM> and the like. (3) Revise the character sizes of the blocks specified by a tag the user designates. In this case, the user can select any block to be subjected to the scaling in the current settings. FIG. 16 illustrates a case where the user designates the processing of all the text elements.

At the next step S1502, the processing makes a decision as to whether the user selects only the current block or not. When the user selects only the current block, the processing is completed. Otherwise, the processing proceeds to step S1503.

When any block to be processed is present other than the current block, the procedure searches for a target block at step S1503. As for a search method, the procedure searches the document using the current target tag with checking as to whether the next tag is a target tag or not. Since the example of FIG. 16 applies the processing to all the text blocks, the procedure checks whether the tag is associated with the text, and selects it as a new target block when it is found. When the option "For all text blocks designated" is selected in the example of FIG. 16, the procedure checks whether it is the designated tag or not, and selects the block as a new target block when the designated tag is found.

At step S1504, the procedure checks whether the target tag is not found, or whether the processing has been completed for all the target tags. If no target tag remains, the processing is completed. As long as any target tag is found, the procedure proceeds to step S1505.

The processing of step S1505 is the same as that of the foregoing step S709, in which the revision is designated for the font size. The processing is carried out using the same scaling factor as that of step S709. The processing does not revise the width of the original text area, but places the characters one by one according to the new specified font size. The character is returned to the initial position when its position exceeds the width.

When all the character strings have been placed, the procedure obtains the height of the area, which becomes the new height of the text area at step S1506.

Second Embodiment

Figure 17:
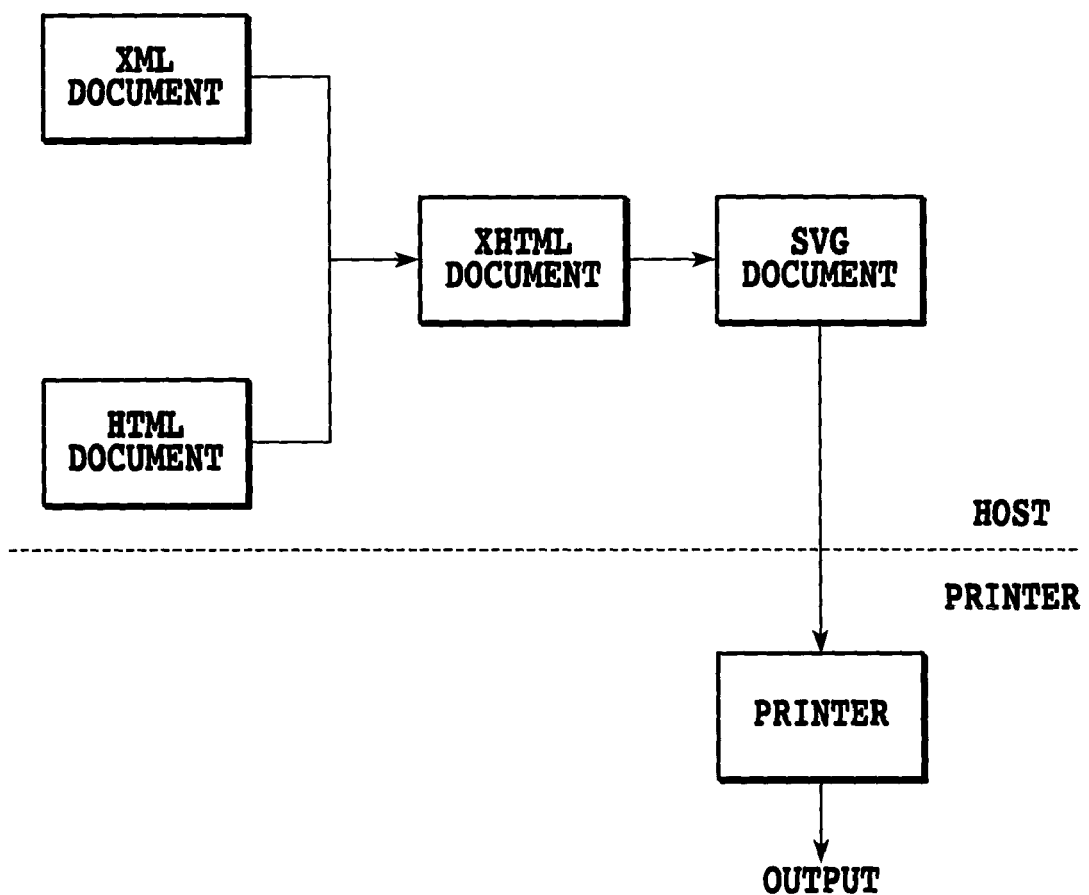
FIG. 17 is a block diagram illustrating a file conversion processing of a second embodiment in accordance with the present invention.

FIG. 17 shows a flow of the file conversion in a second embodiment in accordance with the present invention. The flow of the processing is divided to host side processing and printer side processing. The host side processing is carried out on the Web server 2 or by the client personal computer 3 or 4 of FIG. 1. First, the file server reads a document stored in an XML format or HTML format, and converts it into XHTML (Extensible HyperText Markup Language) format data. Subsequently, the XHTML format data is converted to SVG (Scalable Vector Graphic) for making a suitable layout in accordance with the output paper size and resolution according to the flowchart illustrated in FIG. 18.

Figure 18:
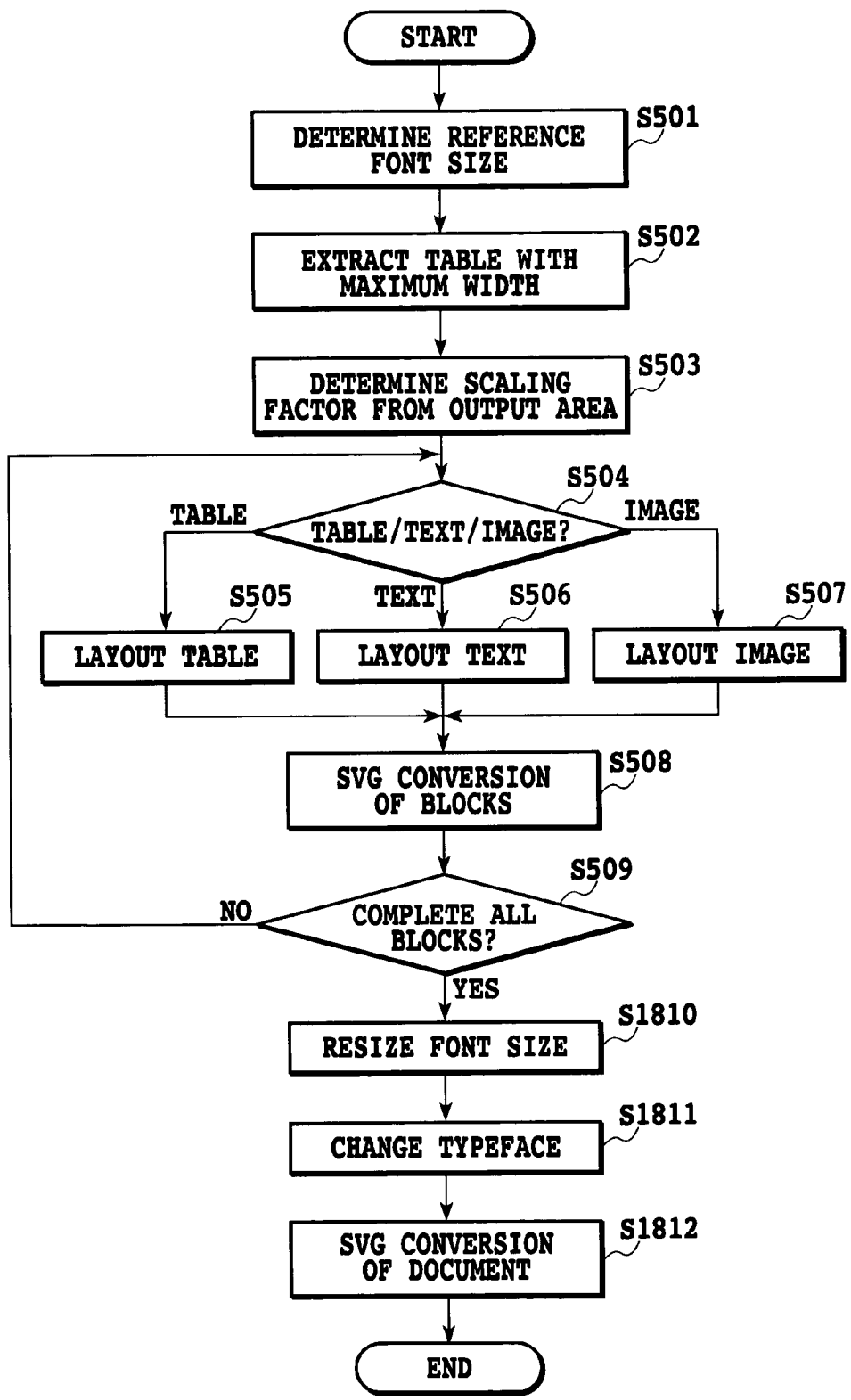
FIG. 18 is a flowchart illustrating the operation of a control program stored in the ROM of FIG. 2, an example of a control program for converting XHTML format document data to SVG format document data.

FIG. 18 is a flowchart illustrating a control program stored in the ROM 102 of FIG. 2 as another example of a control program for converting the XHTML format document data to the SVG format document data.

The processing from step S501 to step S509 is the same as that of the first embodiment. In the present embodiment, the procedure checks the minimum value of the font size to be output considering the results of the placement in the individual elements and calculation of the font size at step S1810. If the data with the font size smaller than a preset font size are present, they will be too small to be easily intelligible when printed. Thus, processing to increase the size of the entire area is carried out, the details of which will be described later with reference to the flowchart of FIG. 20.

Although the font size is set at a value greater than the minimum font size at step S1810, the characters may be collapsed into black blocks in the bold typefaces and the like, or become unintelligible in cursive characters because of their complicated face.

In view of this, at step S1811, the procedure automatically converts the characters into a more readable typeface in response to the typeface and size, thereby printing them in a similar, more readable typeface. This may enable the minimum value at step S1810 to be further reduced.

More specifically, assume that the system has the data of Mincho typeface W3, Mincho typeface W5, Mincho typeface W7, Gothic typeface W3, Gothic typeface W5, Gothic typeface W7, gyosho (semi-cursive style), and kaisho (square style) as shown in FIG. 19.

As for the Mincho typeface W3, for example, since print of the Mincho typeface W3 are intelligible as long as the character size is equal to or greater than 4 point, the typeface is used without change in this case. However, when the character size is less than 4 point, "Uchikomi" (start of a stroke) or "Uroko" (triangular end of a stroke) specific to the Mincho typeface can hinder the intelligibility. Thus, they are replaced by the corresponding data of the Gothic typeface W3.

As for the Mincho typeface W5, it is used without change when its size is equal to or greater than 5 point. When its size is equal to or greater 4 point but less than 5 point, it is replaced by the Mincho typeface W3 because its thick lines can hinder intelligibility. When its size is less than 4 point, it is replaced by the Gothic typeface W3 because even the intelligibility of the Mincho typeface W3 is not enough.

As for the Mincho typeface W7, it is used without change when its size is equal to or greater than 5 point. When its size is equal to or greater 4 point but less than 5 point, it is replaced by the Mincho typeface W3. In addition, when its size is less than 4 point, it is replaced by the Gothic typeface W3.

In this way, small characters are replaced so that their typefaces become intelligible. Smaller characters are replaced by most intelligible characters so that the minimum point size obtained at step S1810 can be made as small as possible.

Finally, at step S1812, the procedure completes the creation of the SVG document by enclosing the entire document by <svg> and </svg> after calculating the placements of all the elements, and by defining the style sheet by the <style> element as needed.

Figure 20:
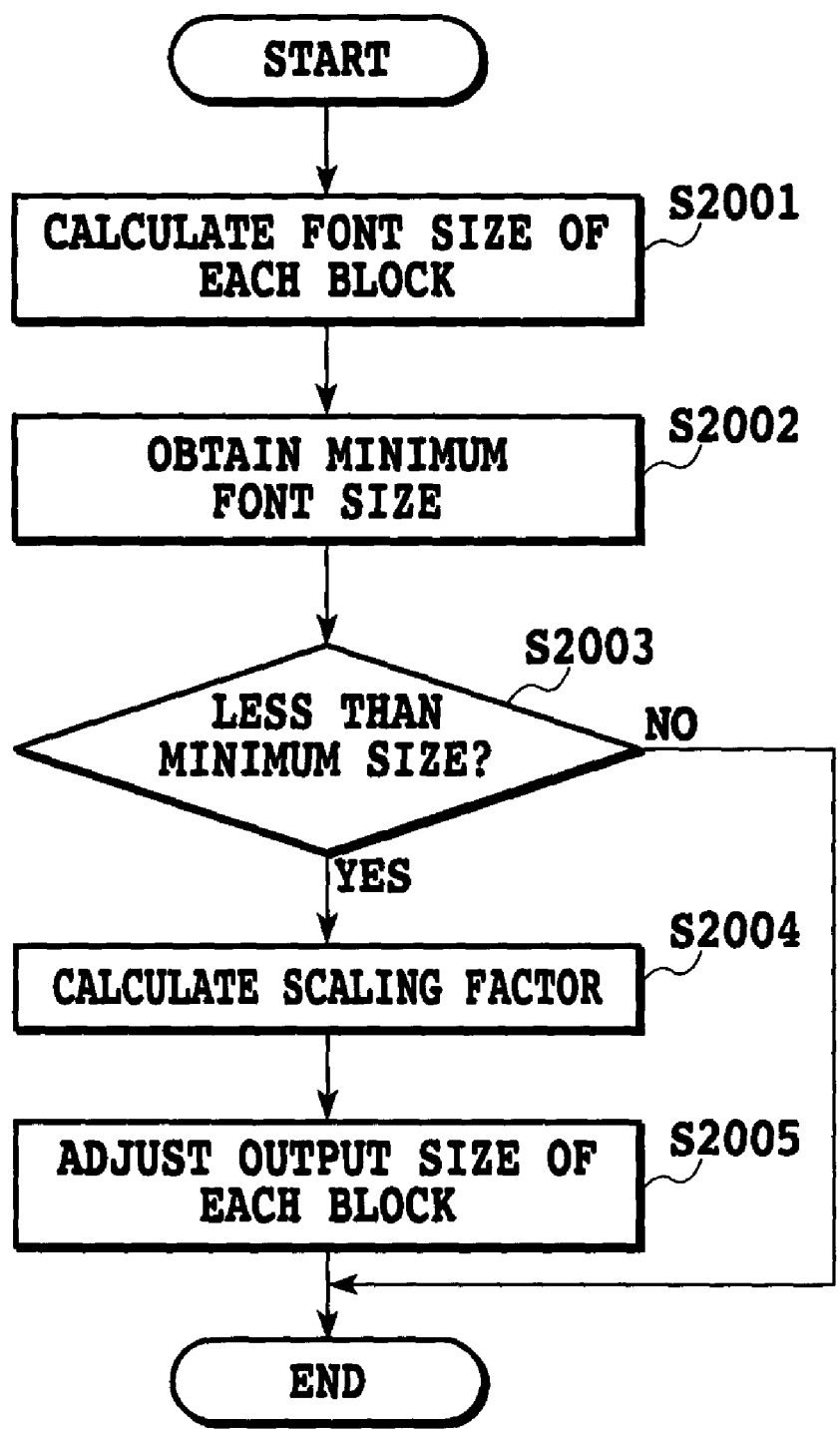
FIG. 20 is a flowchart illustrating step S508 (FIG. 18) in more detail, which carries out the minimum value check of font sizes and reconfiguration processing of the layout of individual blocks in accordance with the minimum value check.

FIG. 20 is a flowchart illustrating the details of step S508 (FIG. 18) that checks the minimum value of the font size, and makes the layout of the individual blocks again in response to the minimum value. At step S2001, the procedure obtains the reference font sizes of the individual blocks from the reference font size obtained at step S501 and the scaling factors of the individual blocks obtained at step S503. The reference font sizes are obtained by the following expression: the reference font size=(reference font size)×(scaling factor).

Then, at step S2002, the procedure compares the reference font sizes of the individual blocks calculated at step S2001 to extract the minimum font size. At step S2003, the procedure compares the minimum value of the preset reference font size with the minimum font size extracted at step S2002. When the minimum font size extracted at step S2002 is greater than the minimum value of the reference font size, the procedure completes the processing because it is not necessary to continue it.

On the other hand, when the minimum font size extracted at step S2002 is less than the minimum value of the reference font sizes, the output font is too small, which has a harmful effect on readability of the font printed. Thus, the procedure proceeds to step S2004 to enlarge the minimum font size to the minimum value of the reference font size.

At step S2004, the procedure calculates the scaling factor for scaling up the minimum font size obtained at step S2002 to the minimum value of the reference font size. At step S2005, the procedure multiplies the font sizes, placement coordinate values and widths and heights of the areas of all the blocks by the scaling factor obtained at step S2004, thereby increasing the entire area.

Figure 21:
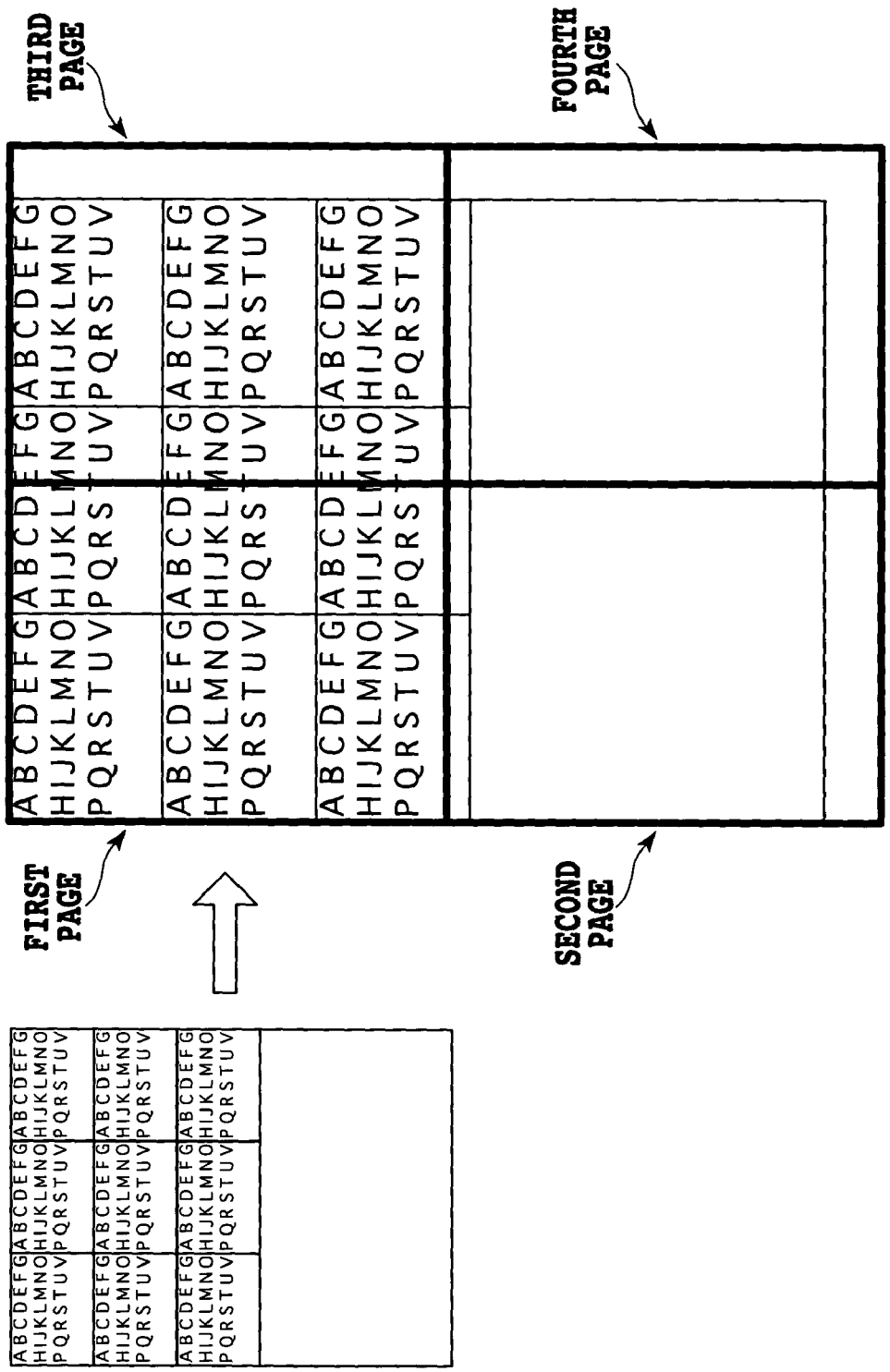
FIG. 21 is a diagram illustrating an example of the scale-up of a font size.

The processing enables the document, which is forcedly downsized to the designated output paper size, and hence the characters of which can be collapsed, to be enlarged onto a plurality of pages as illustrated in FIG. 21. Thus, the printer side prints the expanded areas over the plurality of pages.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A document printing system comprising:
   a first calculation unit for calculating a font size based on a scaling factor of an output area;
   a decision unit for deciding whether or not the font size calculated by said first calculation unit is smaller than a minimum font size;
   a second calculation unit for calculating an expansion ratio for expanding the font size to the minimum font size when said decision unit determines that the font size calculated by said first calculation unit is smaller than the minimum font size;
   an adjusting unit for making an adjustment to expand the output area into a plurality of pages based on the expansion ratio calculated by said second calculation unit; and a selection unit for (i) selecting a first font in a specified typeface without changing its weight if the font size is larger than or equal to a first size, (ii) selecting a second font with the thinnest weight in the specified typeface, even where the first font in the specified typeface and weight exists, if the font size is smaller than the first size and is larger than or equal to a second size, and (iii) selecting a third font in a certain typeface regardless of the specified typeface, even where the first font in the specified typeface and weight exists, if the font size is smaller than the second size.

2. A document printing method comprising:

a first calculation step for calculating a font size based on a scaling factor of an output area;

a decision step for deciding whether or not the font size calculated in said first calculation step is smaller than a minimum font size;

a second calculation step for calculating an expansion ratio for expanding the font size to the minimum font size when it is decided in said deciding step that the font size calculated in said first calculation step is smaller than the minimum font size;

an adjusting step for making an adjustment to expand the output area into a plurality of pages based on the expansion ratio calculated in said second calculation step; and a selection step for (i) selecting a first font in a specified typeface without changing its weight if the font size is larger than or equal to a first size, (ii) selecting a second font with the thinnest weight in the specified typeface, even where the first font in the specified typeface and weight exists, if the font size is smaller than the first size and is larger than or equal to a second size, and (iii) selecting a third font in a certain typeface regardless of the specified typeface, even in case where the first font in the specified typeface and weight exists, if the font size is smaller than the second size, wherein said first calculation step, said decision step, said second calculation step, said adjusting step, and said selection step are performed by a first calculation unit, a decision unit, a second calculation unit, an adjusting unit, and a selection unit, respectively, in a document printing system.

3. A non-transitory computer-readable medium storing thereon a computer program for instructing a computer to execute a method for document printing comprising:

a first calculation step for calculating a font size based on a scaling factor ratio of an output area;

a decision step for deciding whether or not the font size calculated in said first calculation step is smaller than a minimum font size;

a second calculation step for calculating an expansion ratio for expanding the font size to the minimum font size when it is decided in said decision step that the font size calculated in said first calculation step is smaller than the minimum font size;

an adjusting step for making an adjustment to expand the output area into a plurality of pages based on the expansion ratio calculated in said second calculation step; and a selection step for (i) selecting a first font in a specified typeface without changing its weight if the font size is larger than or equal to a first size, (ii) selecting a second font with the thinnest weight in the specified typeface, even where the first font in the specified typeface and weight exists, if the font size is smaller than the first size and is larger than or equal to a second size, and (iii) selecting a third font in a certain typeface regardless of the specified typeface, even in case where the first font in the specified typeface and weight exists, if the font size is smaller than the second size.

* * * * *